US012603532B2

(12) United States Patent
Jang et al.

(10) Patent No.: US 12,603,532 B2
(45) Date of Patent: Apr. 14, 2026

(54) ELECTRIC MOTOR

(71) Applicants: Hyundai Motor Company, Seoul
(KR); Kia Corporation, Seoul (KR)

(72) Inventors: Hyung Kwan Jang, Uijeongbu-Si
(KR); Hoo Dam Lee, Seoul (KR);
Kyung Sik Choi, Seoul (KR); **Jun
Hyeok Choi, Suwon-Si (KR); Byung
Ho Min, Suwon-Si (KR); Tae Gyu
Lee**, Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 231 days.

(21) Appl. No.: 18/387,775

(22) Filed: Nov. 7, 2023

(65) Prior Publication Data

US 2025/0055330 A1      Feb. 13, 2025

(30) Foreign Application Priority Data

Aug. 9, 2023      (KR) ........................ 10-2023-0104216

(51) Int. Cl.
  *H02K 1/14*          (2006.01)
  *H02K 21/24*          (2006.01)
(52) U.S. Cl.
  CPC ............. *H02K 1/146* (2013.01); *H02K 21/24*
                                              (2013.01)
(58) Field of Classification Search
  CPC ............................. H02K 1/146; H02K 21/24
  USPC ...................................................... 310/156.32
  See application file for complete search history.

(56) References Cited

U.S. PATENT DOCUMENTS

| | | | | |
|---|---|---|---|---|
| 6,034,465 | A * | 3/2000 | McKee ............... | F04D 13/0666 |
| | | | | 417/406 |
| 7,049,715 | B2 * | 5/2006 | Neal ...................... | H02K 1/185 |
| | | | | 310/43 |
| 7,247,967 | B2 * | 7/2007 | Ionel ........................ | H02K 3/28 |
| | | | | 310/216.086 |
| 7,474,028 | B2 * | 1/2009 | Shim .................... | H02K 1/2766 |
| | | | | 310/156.53 |
| 7,737,598 | B2 * | 6/2010 | Ionel ........................ | H02K 3/28 |
| | | | | 310/216.058 |
| 8,093,776 | B2 * | 1/2012 | Hino .................... | H02K 21/028 |
| | | | | 310/191 |
| 8,541,918 | B2 * | 9/2013 | Mizuike ................. | H02K 1/146 |
| | | | | 310/90 |

(Continued)

FOREIGN PATENT DOCUMENTS

| | | | | |
|---|---|---|---|---|
| CN | 207339443 U | 5/2018 | | |
| EP | 1612912 A1 * | 1/2006 | ............. | H02K 21/12 |

(Continued)

OTHER PUBLICATIONS

Translation of foreign document CN 207339443 U (Year: 2018).*

*Primary Examiner* — Alex W Mok
(74) *Attorney, Agent, or Firm* — MORGAN, LEWIS &
BOCKIUS LLP

(57)          ABSTRACT
An electric motor includes a back yoke provided as an
outermost layer of a stator, a stator core including a first
teeth portion protruding from the back yoke toward the
center portion of the stator and a second teeth portion
protruding upwards from the external upper surface of the
first teeth portion, a coil winding around the stator core, and
a rotor in which a permanent magnet is mounted on the rotor
core and which rotates through a magnetic interaction with
the stator.

15 Claims, 10 Drawing Sheets

(56) References Cited

U.S. PATENT DOCUMENTS

| | | | | |
|---|---|---|---|---|
| 9,083,225 | B2 * | 7/2015 | Tonogi | H02K 1/148 |
| 9,831,752 | B2 * | 11/2017 | Dien | H02K 21/12 |
| 9,966,807 | B2 * | 5/2018 | Yokoyama | H02K 3/18 |
| 10,340,753 | B2 * | 7/2019 | Rhyu | H02K 1/12 |
| 10,491,068 | B2 * | 11/2019 | Seo | H02K 1/2795 |
| 11,018,565 | B2 * | 5/2021 | Post | H02K 1/2795 |
| 11,121,596 | B2 * | 9/2021 | Hattori | H02K 1/146 |
| 11,296,563 | B2 * | 4/2022 | Nose | H02K 3/18 |
| 11,374,444 | B2 * | 6/2022 | Kislev | H02K 1/14 |
| 11,451,099 | B2 * | 9/2022 | Kislev | H02K 15/022 |
| 2005/0285474 | A1 * | 12/2005 | Kaneko | H02K 29/03 |
| | | | | 310/266 |
| 2007/0252447 | A1 * | 11/2007 | Lonel | H02K 29/03 |
| | | | | 310/44 |
| 2008/0018195 | A1 * | 1/2008 | Kitamura | H02K 1/145 |
| | | | | 310/49.32 |
| 2008/0054737 | A1 * | 3/2008 | Inayama | H02K 1/148 |
| | | | | 310/44 |
| 2009/0152968 | A1 * | 6/2009 | Ishikawa | H02K 5/00 |
| | | | | 310/90 |
| 2010/0295385 | A1 | 11/2010 | Hsu et al. | |
| 2014/0145564 | A1 | 5/2014 | Taniguchi et al. | |
| 2014/0319954 | A1 * | 10/2014 | Dien | H02K 21/12 |
| | | | | 310/208 |
| 2015/0122235 | A1 * | 5/2015 | Arita | H02K 1/08 |
| | | | | 310/46 |
| 2015/0303745 | A1 * | 10/2015 | Matsumoto | H02K 9/223 |
| | | | | 310/43 |
| 2017/0214281 | A1 * | 7/2017 | Seo | H02K 1/146 |
| 2019/0190362 | A1 * | 6/2019 | Nakagawa | H02K 21/12 |

FOREIGN PATENT DOCUMENTS

| | | |
|---|---|---|
| JP | 2012-182941 | 9/2012 |
| JP | 2017-169284 | 9/2017 |
| KR | 10-1436584 | 8/2014 |
| KR | 10-2016-0017160 | 2/2016 |
| KR | 10-1892961 | 8/2018 |
| KR | 10-2423928 | 7/2022 |

* cited by examiner stator (100,200,300)

FIG. 9 coil (200) of stator (100,200,300)

ELECTRIC MOTOR

CROSS REFERENCE TO RELATED APPLICATION

The present application claims priority to Korean Patent Application No. 10-2023-0104216 filed Aug. 9, 2023, the entire contents of which is incorporated herein for all purposes by this reference.

BACKGROUND OF THE PRESENT DISCLOSURE

Field of the Present Disclosure

The present disclosure relates to an electric motor, and more particularly to an electric motor in which a stator interacts with both the axial and transverse magnetic fluxes of a permanent magnet on a rotor.

Description of Related Art

In general, motors are devices that transform electrical energy into mechanical energy to generate rotational power. The motors find extensive applications across a spectrum of fields, ranging from household electronics to diverse industrial machinery. A typical motor consists of two main components: a stator affixed to a housing or casing and wound with a coil to generate a rotor system when power is applied and a rotor provided to rotate around a shaft within the stator. These components are designed so that the magnetic flux generated by the stator interacts with the rotor to generate rotational torque.

Meanwhile, research and development focused on types of eco-friendly and fuel-efficient vehicles other than vehicles provided with internal combustion engines, that is, hybrid vehicles and electric vehicles, has been actively conducted in recent years. Hybrid vehicles are driven by two power sources by linking a conventional combustion engine and an electric motor while electric vehicles are solely driven by an electric drive motor, offering the potential for reduced environmental pollution caused by exhaust emission and improved fuel efficiency so that the hybrid and electric vehicles are positioning themselves as practical alternatives for the next generation of vehicles. In these hybrid and electric vehicles, the motor becomes a pivotal component that determines overall vehicle performance, and the development of high-power and compact motors has become a topic of great interest, in the context of hybrid vehicles.

Furthermore, with the recent development of semiconductors, electric motors employ a method of placing a permanent magnet on the rotor and winding coil on the stator, to which power is supplied. By sequentially magnetizing the stators, the present method simulates an effect of the stator rotating and thus causes the rotor, which magnetically corresponds to the stator, to rotate. This type of electric motor is referred to as a brushless DC motor (BLDC motor).

At the present time, the magnet flux orientation of the permanent magnet on the rotor allows differentiation between transverse motors and axial motors. The magnetic flux is oriented transversely in transverse motors while the magnetic flux is oriented axially in axial motors.

However, generally, both the transverse and axial motors include a problem of magnetic flux leakage. Specifically, both types of electric motors share a common issue: the stator is aligned with the main magnetic flux orientation so that the stator and the rotor do not interact with each other in magnetic flux orientations other than the main magnetic flux orientation. Accordingly, the output of the electric motor is reduced due to the inability to fully utilize the magnetic flux generated by the permanent magnet positioned on the rotor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electric motor and proposes an electric motor in which a stator interacts with both transverse and axial magnetic fluxes generated by the permanent magnet.

According to various exemplary embodiments of the present disclosure, an electric motor may include a back yoke provided as an outermost layer of a stator, a stator core including a first teeth portion protruding from the back yoke toward the center portion of the stator and a second teeth portion protruding upwards from the external upper surface of the first teeth portion, a coil winding around the stator core, and a rotor in which a permanent magnet is mounted on the rotor core and which rotates through a magnetic interaction with the stator.

The back yoke may include a first support portion positioned on a lower surface of the stator core and protruding toward the center portion of the stator.

The length of the first support portion in the direction of the center portion of the stator may be greater than the length of the first teeth portion in the direction of the center portion of the stator.

The coil may include a first coil portion winding around the first teeth portion and a second coil portion winding around the second teeth portion, and the first and second coil portions may be connected to each other at end portions of the first and second coil portions to form a single coil winding around the stator core.

The first coil portion may include a shape of winding around first and second sides of the first teeth portion and an internal surface thereof facing the center portion of the stator while the second coil portion may include a shape of winding around first and second sides and the upper surface of the second teeth portion, and the first and second coil portions may be connected to each other at first and second end portions thereof on first and second sides of the stator core.

Once the coil is attached to the stator core, the coil may be fixed to the stator core by applying a fixing material.

The permanent magnet on the rotor may be disposed on the front surface of the rotor core to face the stator.

The radius of the rotor core may be less than the radius of the second teeth portion so that the rotor may be positioned within the stator core.

The stator may be positioned on first and second sides of the rotor so that the rotor may be positioned within the stator, and the permanent magnet may be attached to the surface of the rotor core or inserted into the rotor core.

The stator core may include a third teeth portion protruding upwards from an internal upper surface of the first teeth portion.

The coil may include a first coil portion winding around the first teeth portion, a second coil portion winding around the second teeth portion, and a third coil portion winding around the third teeth portion, and the first and second coil portions may be connected to each other at the end portions thereof and the first and third coil portions may be connected to each other at end portions of the first and second coil portions to form a single coil winding around the stator core.

The first coil portion may include a shape of winding around first and second sides of the first teeth portion, the second coil portion may include a shape of winding around first and second sides and the upper surface of the second teeth portion, and the third coil portion may include windings around first and second sides and the upper surface of the third teeth portion. The first and second coil portions may be connected to each other at the end portions thereof at the rear of the stator core on first and second sides thereof and the first and third coil portions may be connected to each other at the end portions thereof at the front of the stator core on both sides.

The back yoke may include a first support portion positioned on a lower surface of the stator core and protruding toward the stator center, and the length of the first support portion in the direction of the center portion of the stator may be less than the length of the first teeth portion in the direction of the center portion of the stator.

A second support portion extending in the height direction and formed in the circumferential direction may be formed at the center portion of the stator and a through hole for a shaft to pass through may be formed at the center portion of the second support portion.

The second support portion may be in contact with the internal surface of the first teeth portion facing the center portion of the stator and include a length in the height direction equal to or greater than the length of the back yoke.

The permanent magnet on the rotor may be disposed on the front surface of the rotor core to face the stator, and the transverse width of the permanent magnet on the rotor may be less than the width of the space between the second and third teeth portions so that the permanent magnet may be positioned in the space between the second and third teeth portions.

The stator may be positioned on first and second sides of the rotor so that the rotor may be positioned within the stator, the permanent magnet may be attached to the surface of the rotor core or inserted into the rotor core, and the transverse width of the rotor may be less than the width of the space between the second and third teeth portions.

According to an exemplary embodiment of the present disclosure, the stator of the electric motor may be formed to interact with both the transverse and axial magnetic fluxes of the permanent magnet on the rotor so that the magnetic flux of the permanent magnet may be fully utilized. Accordingly, the increased amount of the interacting magnetic fluxes produces an effect of increasing the maximum torque of the electric motor, resulting in an effect of increasing the maximum output of the electric motor.

Furthermore, because the output of the electric motor relative to the same weight is large compared to the related art, there is an effect of reducing the size of the electric motor for the same output requirement according to an exemplary embodiment of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION

FIG. 3 is a view exemplarily illustrating a stator core of the stator illustrated in FIG. 1.

FIG. 9 is a view exemplarily illustrating a coil of the stator illustrated in FIG. 6.

Figure 1:
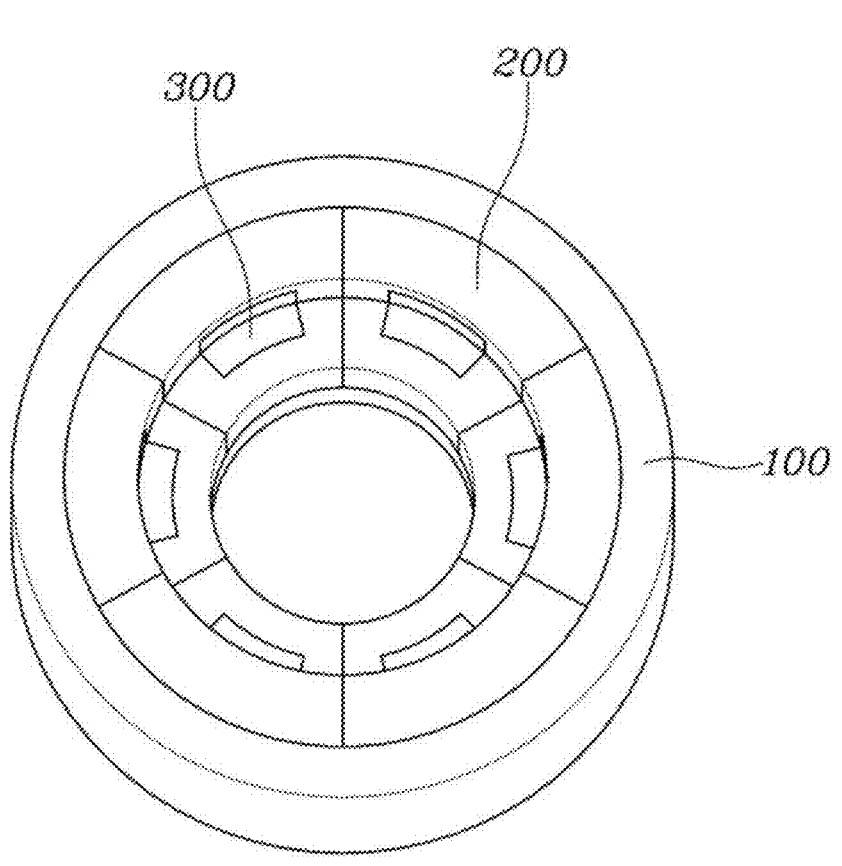
FIG. 1 is a view exemplarily illustrating a stator according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 2:
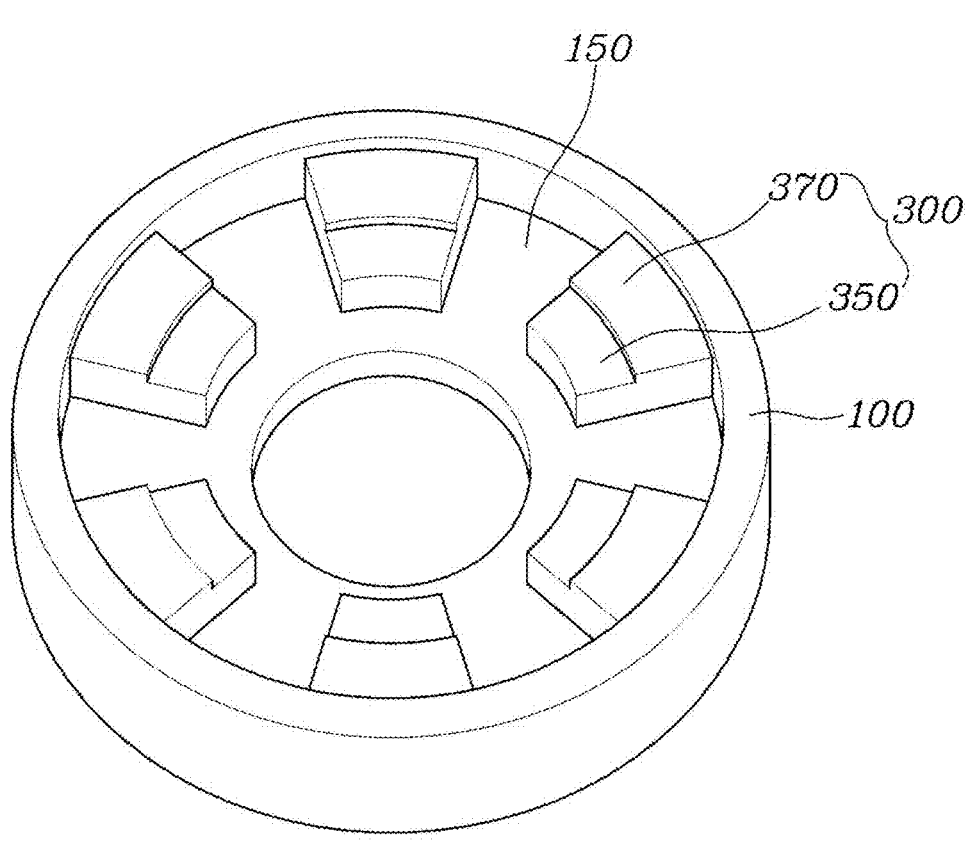
FIG. 2 is a view exemplarily illustrating the stator illustrated in FIG. 1 with a coil removed.
Figure 3:
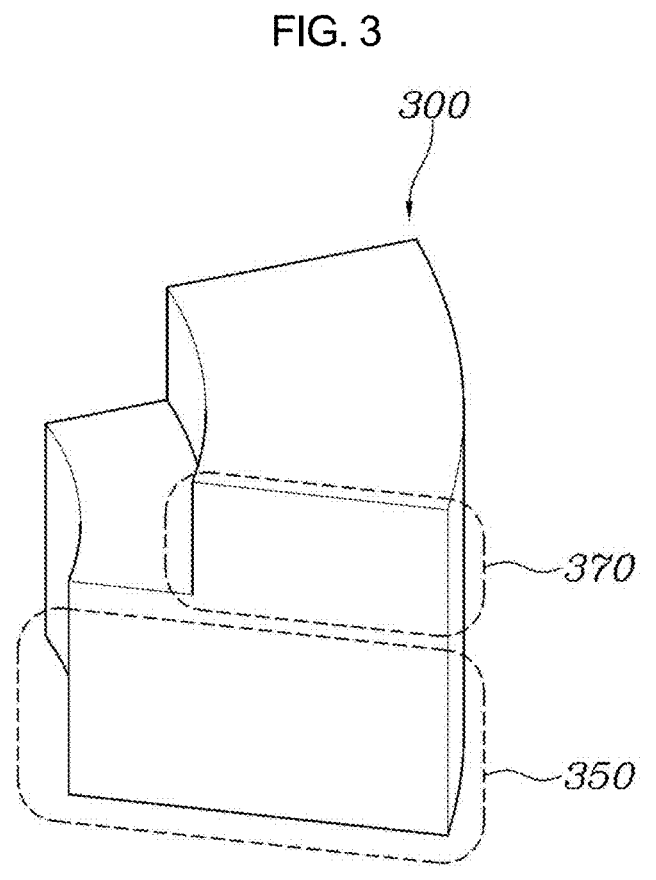
Figure 4:
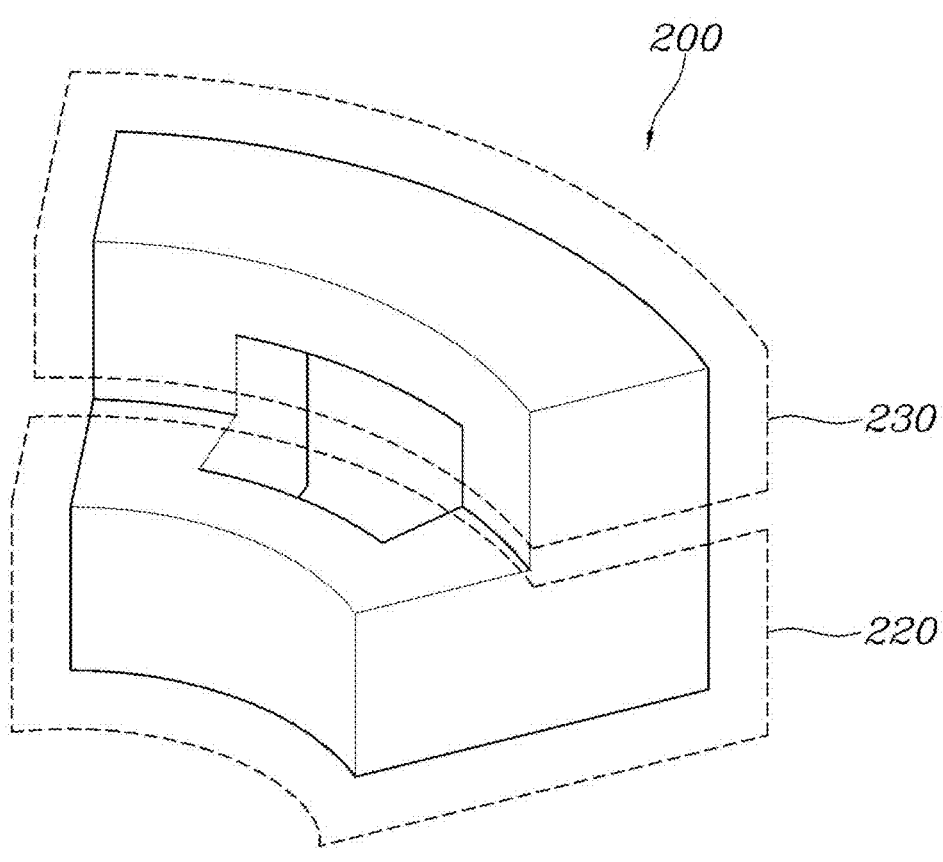
FIG. 4 is a view exemplarily illustrating a coil of the stator illustrated in FIG. 1.
Figure 5:
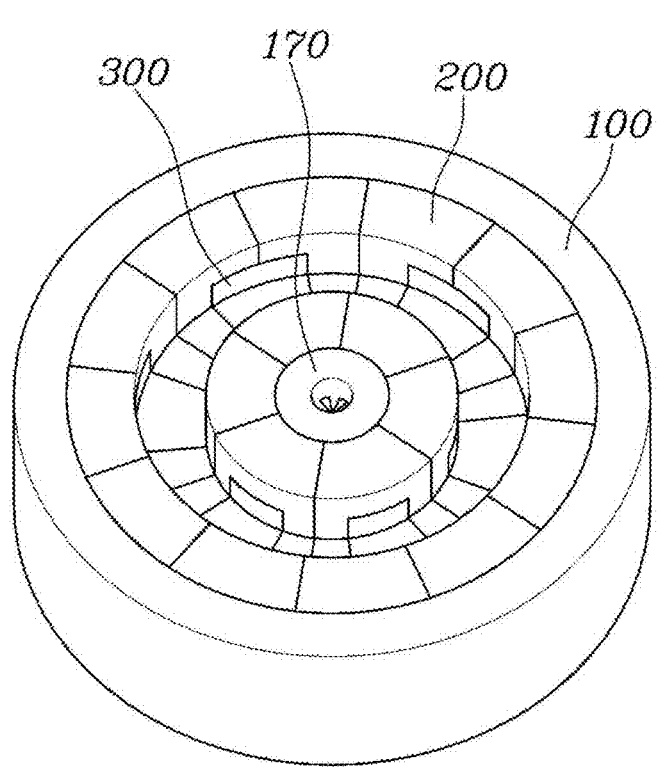
FIG. 5 is a view exemplarily illustrating the stator illustrated in FIG. 1 applied to an axial electric motor.
Figure 6:
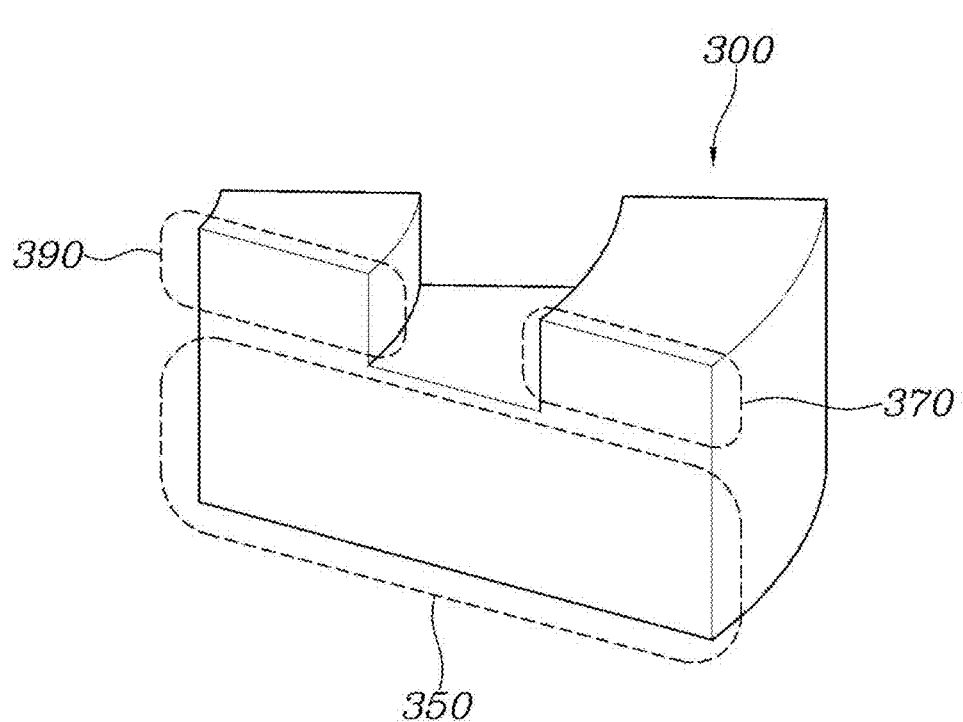
FIG. 6 is a view exemplarily illustrating a stator according to various exemplary embodiments of the present disclosure.
Figure 7:
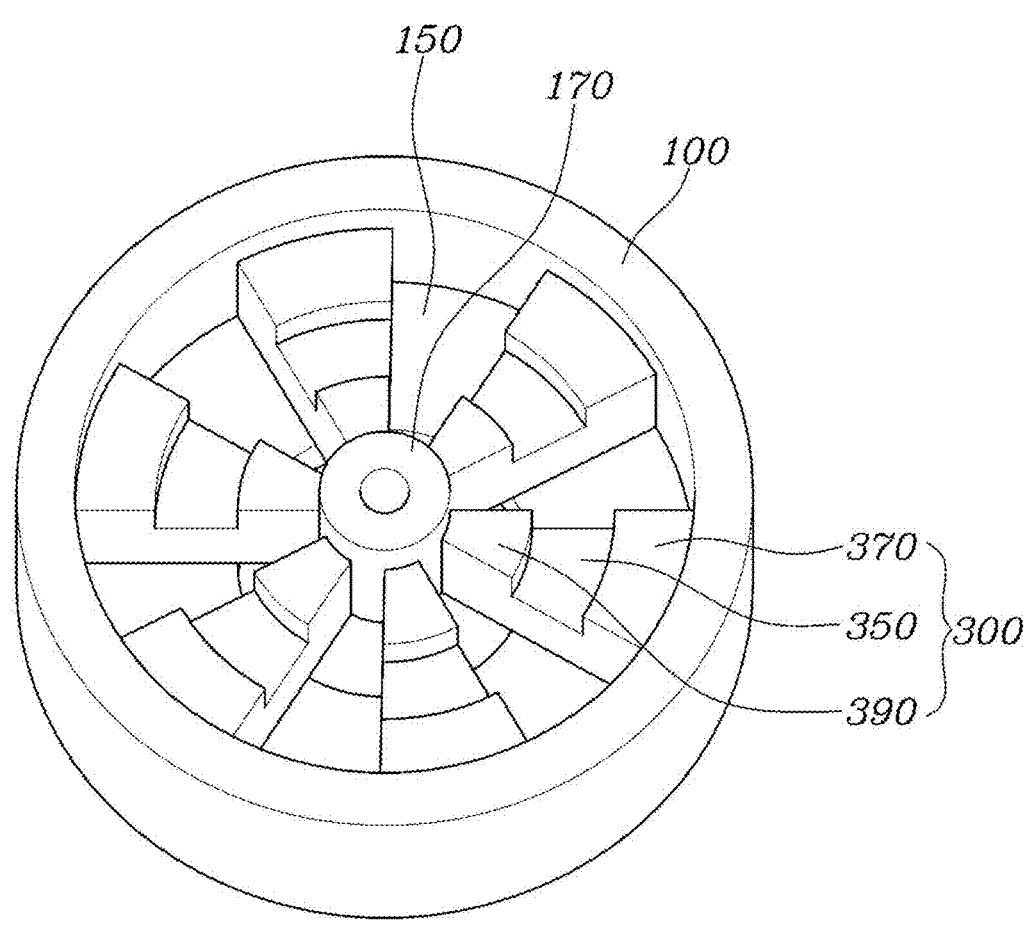
FIG. 7 is a view exemplarily illustrating the stator illustrated in FIG. 6 with a coil removed.
Figure 8:
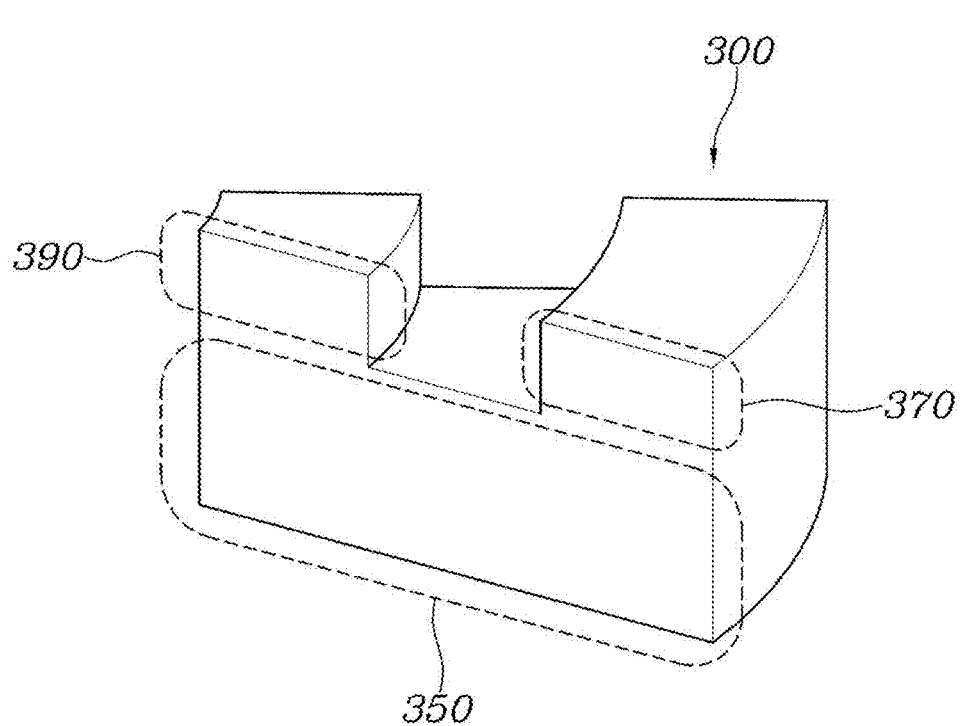
FIG. 8 is a view exemplarily illustrating a stator core of the stator illustrated in FIG. 6.
Figure 9:
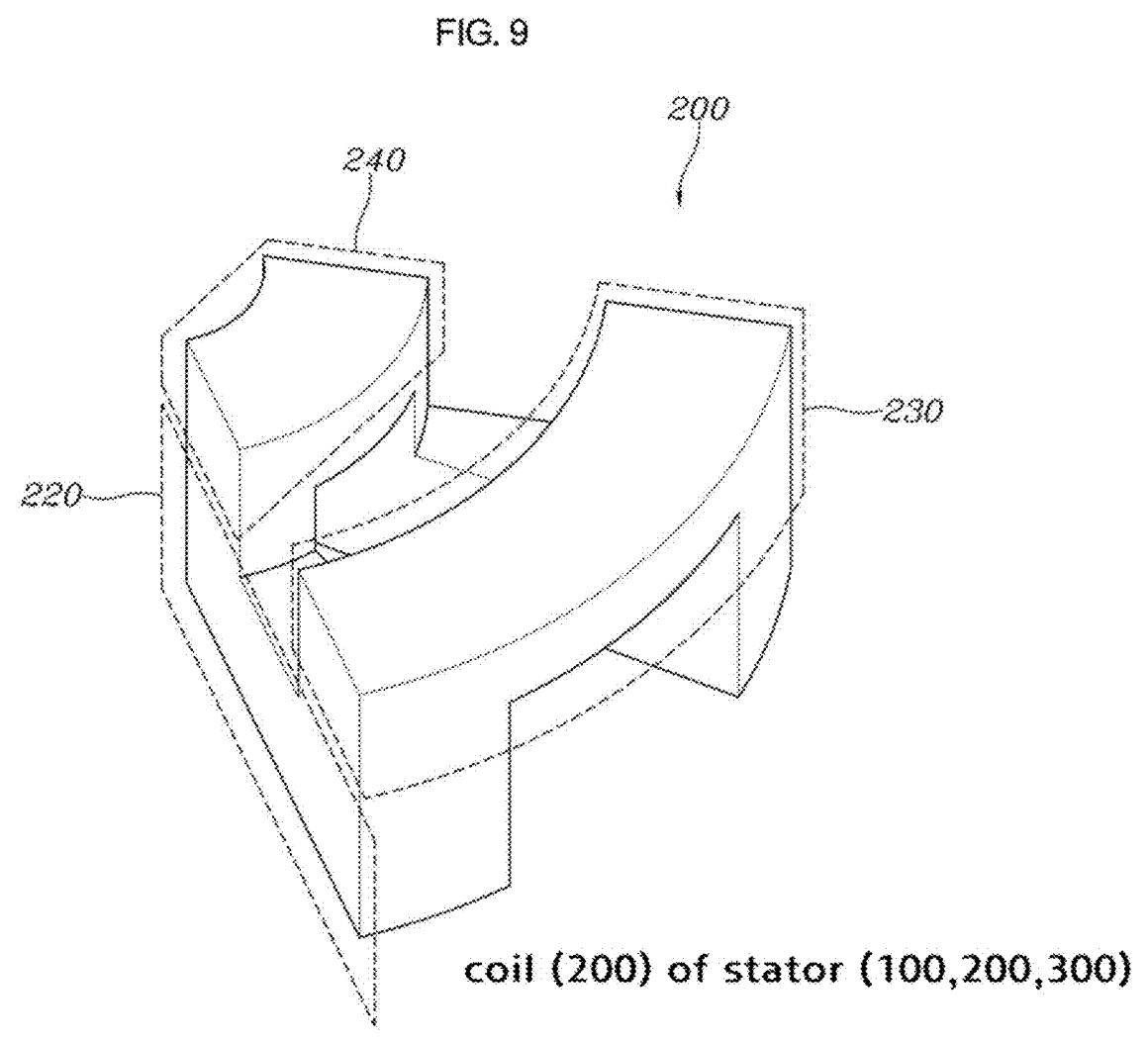
Figure 10:
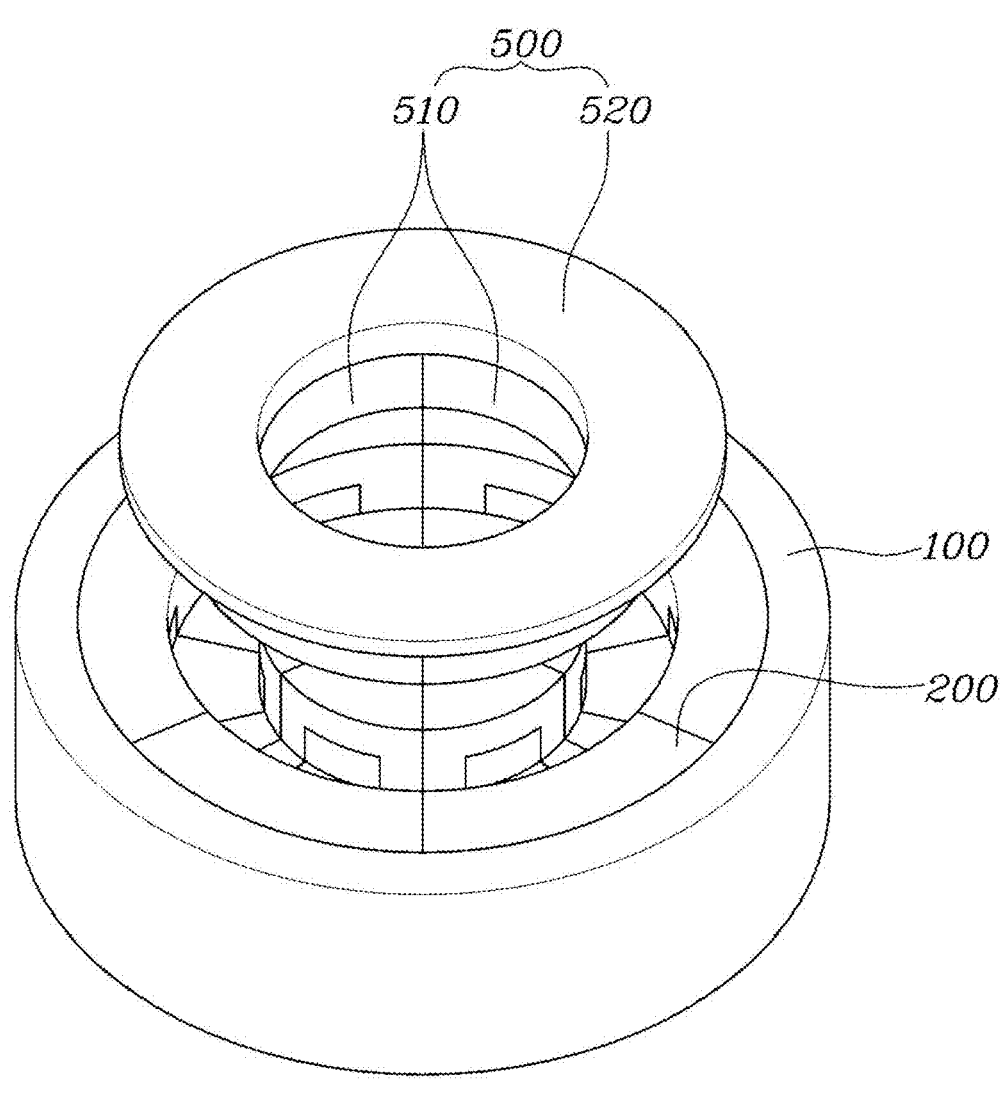
FIG. 10 is a view exemplarily illustrating the stator illustrated in FIG. 6 applied to an axial electric motor.

FIG. 1 is a view exemplarily illustrating a stator according to various exemplary embodiments of the present disclosure. FIG. 2 is a view exemplarily illustrating the stator illustrated in FIG. 1 with a coil removed. FIG. 3 is a view exemplarily illustrating a stator core of the stator illustrated in FIG. 1. FIG. 4 is a view exemplarily illustrating a coil of the stator illustrated in FIG. 1. FIG. 5 is a view exemplarily illustrating the stator illustrated in FIG. 1 applied to an axial electric motor. FIG. 6 is a view exemplarily illustrating a stator according to various exemplary embodiments of the present disclosure. FIG. 7 is a view exemplarily illustrating the stator illustrated in FIG. 6 with a coil removed. FIG. 8 is a view exemplarily illustrating a stator core of the stator illustrated in FIG. 6. FIG. 9 is a view exemplarily illustrating a coil of the stator illustrated in FIG. 6. FIG. 10 is a view exemplarily illustrating the stator illustrated in FIG. 6 applied to an axial electric motor.

Hereinafter, various exemplary embodiments included in the present disclosure will be described in detail with reference to the accompanying drawings, but the same reference numerals will be assigned to the similar or same components regardless of drawing numbers and repetitive descriptions will be omitted.

The suffixes "module" and "unit" for the components used in the following description are provided or interchangeably used only to facilitate the writing of the specification, without necessarily indicating a distinct meaning or role of their own.

When it is determined that the specific description of the related and already known technology may obscure the essence of the embodiments included herein, the specific description will be omitted. Furthermore, it is to be understood that the accompanying drawings are only intended to facilitate understanding of the embodiments included herein and are not intended to limit the technical ideas included herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed.

Singular expressions include plural expressions unless context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Generally, both the transverse and axial electric motors generate the maximum torque by either the transverse magnetic flux or the axial magnetic flux of the permanent magnet on the rotor. The magnetic flux generated by the permanent magnet generates a closed circuit by the continuity of the magnetic flux, and in the case of the transverse electric motor, the transverse magnetic flux mainly interacts with the stator to generate the maximum torque while, in the case of the axial electric motor, the axial magnetic flux mainly interacts with the stator to generate the maximum torque.

Accordingly, the transverse electric motor has the disadvantage that the axial magnetic flux is not effectively utilized in the output of the electric motor and leaks due to its inability to interact with the stator while the axial electric motor has the disadvantage that the transverse magnetic flux leaks due to its inability to interact with the stator. The maximum torque of the electric motor is proportional to the amount of magnetic flux interacting with the stator and the permanent magnet on the rotor. The magnetic flux leakage caused by interaction failure indicates a reduced maximum torque amount of the electric motor, which ultimately translates into a decreased output of the electric motor.

Accordingly, the present disclosure is directed to providing a new stator and rotor, different from the related art, which allows both the axial and transverse magnetic fluxes of the permanent magnet of the rotor to interact with the stator.

First, various exemplary embodiments of the present disclosure will be described in detail below. According to various exemplary embodiments of the present disclosure, an electric motor includes a back yoke provided as the outermost layer of the stator, a stator core including a first teeth portion protruding from the back yoke toward the center portion of the stator and a second teeth portion protruding upwards from the exterior of the upper surface of the first teeth portion, a coil winding around the stator core, and a rotor in which a permanent magnet is disposed in a rotor core and which rotates through a magnetic interaction with the stator.

The stator will be described in detail with reference to FIG. 1, FIG. 2, FIG. 3, and FIG. 4. The back yoke 100 is a structure to protect and support a stator coil, is formed in the circumferential direction, and is configured as the outermost layer of the stator. Furthermore, the back yoke 100 may include a first support portion 150 protruding toward the center portion of the stator and formed on the lower surface of the stator core 300 to be described below. Forming the first support portion 150 may further strengthen the rigidity in the axial direction thereof. Furthermore, the length of the first support portion 150 protruding toward the center portion of the stator is greater than the length of a first teeth portion 350, to be described below, protruding toward the center portion of the stator to provide safer protection for the stator core. The related art has the disadvantage that the stator in the axial electric motor lacks stability due to the absence of a yoke. However, the first support portion may resolve the disadvantage. That is, the present disclosure may enhance the stability of the stator through the back yoke 100 and the first support portion 150.

Next, the stator core 300 will be described with reference to FIG. 3. The stator core 300 includes the first teeth portion 350 protruding toward the center portion of the stator and the second teeth portion 370 protruding upwards from the external upper surface of the first teeth portion 350. The coil 200, to be described below, may be supported through the first teeth portion 350 and the second teeth portion 370. At the instant time, the stator core 300 may include a shoe structure at the end portion in the internal circumferential direction thereof. The shoe structure secures stability by enhancing the fixing force of the coil winding around the stator core 300. Furthermore, the shoe structure may reduce the size of the air gap between the stator and rotor so that the magnetic flux leakage through the air gap may be minimized. The back yoke 100 and the stator core 300 may be made of magnetic or non-magnetic materials.

Next, an exemplary embodiment of the coil 200 applied to various exemplary embodiments will be described with reference to FIG. 4. The coil 200 is formed to generate the transverse and axial magnetic fields. The coil 200 includes a first coil portion 220 winding around the first teeth portion 350 and a second coil portion 230 winding around the second teeth portion 370. The first coil portion 220 and the second coil portion 230 are connected to each other at end portions of the first and second coil portions to form a single coil 200 winding around the stator core 300. The first coil portion 220 includes a shape of winding around both sides of the first teeth portion 350 and the internal surface thereof facing the center portion of the stator while the second coil portion 230 includes a shape of winding around both sides and the upper surface of the second teeth portion 370, and the first coil portion 220 and the second coil portion 230 may be connected to each other at both end portions thereof on both sides of the stator core 300.

Furthermore, the coil 200 is processed to form the first coil portion 220 and the second coil portion 230 and then is attached to the stator core 300. Once the coil 200 is attached to the stator core 300, a fixing material is applied to secure the coil 200 to the stator core 300. An example of the fixing material may be epoxy, but the fixing material is not limited thereto.

At the present time, the coil 200 may be insulated with an enamel coating. Furthermore, insulating paper or the like may be inserted between neighboring coils to ensure insulation between neighboring coils even in high-voltage models. Furthermore, coil 200 may be made of a superconductor, aluminum, or copper. That is, the coil 200 may be made of a conductor with low resistance to allow the intensity of the magnetic field generated by applying power to be strong.

Next, the application of the stator to an axial electric motor according to various exemplary embodiments of the present disclosure will be described with reference to FIG. 5. Generally, the coil winds around the stator of the axial electric motor to generate an axial magnetic field parallel to the shaft when the power is applied to the coil. Accordingly, the axial magnetic flux of the permanent magnet and the axial magnetic field of the stator interact with each other to generate a magnetic rotation force. However, a disadvantage is that the transverse magnetic flux of the permanent magnet leaks due to the inability of the transverse magnetic flux generated by the permanent magnet on the rotor to interact with the magnetic field generated by the stator.

According to an exemplary embodiment of the present disclosure, the transverse magnetic flux of the rotor may interact with the magnetic field of the stator in the axial electric motor. The permanent magnet 510 on the rotor 500 is disposed on the front surface of the rotor core 520 to face the stator. At the instant time, the radius of the permanent magnet 510 on the rotor is less than the radius of the second teeth portion 370 of the stator so that the permanent magnet 510 on the rotor may be positioned within the stator core 300.

The permanent magnet 510 on the rotor is positioned within the stator so that the magnetic flux generated by applying power to the second coil portion 230 winding around the second teeth portion 370 of the stator and the transverse magnetic flux of the permanent magnet 510 interact with each other and the magnetic flux generated by applying power to the first coil portion 220 winding around the first teeth portion 350 and the axial magnetic flux of the permanent magnet 510 interact with each other.

Accordingly, the transverse magnetic flux of the permanent magnet, which leaks in the conventional axial electric motor, interacts with the stator without leaking so that the amount of the magnetic flux interacting with the stator and the permanent magnet increases, resulting in an effect of increasing torque amount applied to the rotor increases.

Next, the application of the stator to a transverse motor according to various exemplary embodiments of the present disclosure will be described. The stator is positioned on both sides of the rotor so that the rotor may be positioned within the stator and the permanent magnet on the rotor may be attached to the surface of the rotor core or inserted into the rotor core. At the instant time, the permanent magnet on the rotor may be attached to the surface, embedded along the circumference, or embedded radially, but the arrangement is not limited to these options.

In the case of the conventional transverse motor, the coil winds to generate a transverse magnetic field when power is applied and the stator core includes a tooth portion protruding toward the center portion of the stator accordingly. Furthermore, in the case of the rotor, the permanent magnet is either attached to the surface of the rotor core or inserted into the rotor core, and the rotor is positioned within the stator so that the transverse magnetic flux of the permanent magnet may interact with the transverse magnetic field of the stator. However, the transverse motor has a disadvantage that the axial magnetic flux of the permanent magnet leaks without interacting with the stator.

According to an exemplary embodiment of the present disclosure, the transverse electric motor may also effectively utilize the axial magnetic flux of the permanent magnet, which leaks in the related art. The stator is positioned on both sides of the rotor so that the rotor may be positioned within the stator. Accordingly, the second coil portion formed to wind around the periphery of the second teeth portion 370 of the stator core and the transverse magnetic flux of the permanent magnet may interact with each other, and the first coil portion formed to wind around the periphery of the first teeth portion 350 of the stator and the axial magnetic flux of the permanent magnet on the rotor may interact with each other. Accordingly, there is an effect of effectively utilizing the axial magnetic flux, which is not used in the related art. That is, the amount of the magnetic flux interacting with the stator and the rotor increases so that the torque applied to the rotor increases, resulting in an effect of increasing the output of the electric motor.

The shape of the electric motor utilizing the magnetic flux leaking in the related art is not limited to various exemplary embodiments of the present disclosure. Various exemplary embodiments will be described with reference to FIG. 6, FIG. 7, FIG. 8, FIG. 9 and FIG. 10. First, the stator according to various exemplary embodiments will be described with reference to FIGS. 6 and 7. The back yoke 100 includes the first support portion 150 positioned on the lower surface of the stator core and protruding toward the center portion of the stator. As described above, the first support portion 150 is configured as a rigidity support body in the axial direction thereof. Furthermore, the length of the first support portion 150 toward the center portion of the stator may be less than the length of the first teeth portion 350. The space formed by the shortage of the length of the first support portion 150 toward the center portion of the stator relative to the length of the first teeth portion 350 toward the center portion allows the air to circulate through and cool the electric motor.

A second support portion 170 extending in the height direction and formed in the circumferential direction may be formed at the center portion of the stator and a through hole for a shaft to pass through may be formed at the center portion of the second support portion 170. The second support portion 170 may be in contact with the internal surface of the first teeth portion 350 facing the center portion of the stator and include a length in the height direction equal to or greater than the height of the back yoke 100.

The second support portion 170 is positioned at the center portion of the stator and includes a through hole for the shaft to pass through to support the shaft so that the shaft is stably secured and there is an effect of enhancing the stability of the electric motor. Furthermore, the second support portion 170 is in contact with the internal surface of the first teeth portion 350 facing the center portion of the stator to support the stator core so that there is the advantage of contributing to the transverse rigidity of the stator. Another advantage is that the length in the height direction of the second support portion 170 is equal to or greater than the height of the back yoke 100 so that there is an effect of protecting a third teeth portion 390 to be described below and the coil winding around the third teeth portion 390.

Next, the stator core 300 will be described with reference to FIGS. 7 and 8. According to various exemplary embodiments of the present disclosure, the stator core 300 further includes the third teeth portion 390 protruding upwards from the internal upper surface of the first teeth portion 350 of the stator core 300. Because the third teeth portion 390 is further formed on the internal upper surface of the first teeth portion and the coil 200 to be described below winds around the third teeth portion, there is an effect of increasing the amount of the magnetic flux interacting with the permanent magnet 510 on the rotor and the stator.

In an exemplary embodiment of the present invention, the third teeth portion 390 is spaced toward the center portion of the state from the second teeth portion 370 by a predetermined length.

An exemplary shape of the coil 200 applied to various exemplary embodiments will be described with reference to FIG. 9. The coil 200 includes the first coil portion 220 winding around the first teeth portion 350, the second coil portion 230 winding around the second teeth portion 370, and the third coil portion 240 winding around the third teeth portion 390. The first coil portion 220 and the second coil portion 230 are connected to each other at the end portions thereof and the first coil portion 220 and the third coil portion 240 are connected to each other at the end portions thereof so that one coil winding around the stator core 300 may be formed.

The first coil portion 220 includes a shape of winding around both sides of the first teeth portion 350, the second coil portion 230 includes a shape of winding around both sides and the upper surface of the second teeth portion 370, and the third coil portion 240 includes a shape of winding around both sides and the upper surface of the third teeth portion 390. Furthermore, the first coil portion 220 and the second coil portion 230 may be connected to each other at the end portions thereof at the rear of the stator core on both sides, and the first coil portion 220 and the third coil portion 240 may be connected to each other at the end portions thereof at the front of the stator core 300 on both sides.

At the present time, the coil 200 may be separately processed into a shape matching the shape of the stator core 300 and then be attached to the stator core 300, and once the coil is attached to the stator core, a fixing material may be applied to secure the coil 200 to the stator core 300. An example of the fixing material may be epoxy, but the fixing material is not limited thereto.

Furthermore, the coil 200 may be formed to match the stator core 300 and then be insulated by enamel coating. Furthermore, insulating paper or the like may be inserted between neighboring coils to ensure insulation between neighboring coils even in high-voltage models.

In an exemplary embodiment of the present disclosure, each of the first teeth portion 350, the second teeth portion 370 and the third teeth portion 390 is repeatedly formed in circumferential direction of the stator coil 300 with a predetermined angle.

Next, the application of the stator to an axial electric motor according to various exemplary embodiments of the present disclosure will be described with reference to FIG. 10. The permanent magnet 510 on the rotor 500 in the axial electric motor may be disposed on the front surface of the rotor core 520 to face the stator. At the instant time, the transverse width of the permanent magnet 510 may be less than the width of the space between the second teeth portion 370 and the third teeth portion 390.

The transverse width of the permanent magnet 510 is less than the width of the gap between the second teeth portion 370 and the third teeth portion 390 so that the permanent magnet 510 may be positioned in the space between the second teeth portion 370 and the third teeth portion 390. Accordingly, the magnetic field generated when power is applied to the second coil portion 230 and the third coil portion 240 winding around the peripheries of the second teeth portion 370 and the third teeth portion 390 may interact with the transverse magnetic flux generated by the permanent magnet 510. Furthermore, the magnetic field generated when power is applied to the first coil portion 220 winding around the periphery of the first teeth portion 350 may interact with the axial magnetic flux generated by the permanent magnet 510.

Accordingly, the transverse magnetic flux of the permanent magnet, leaking in the axial electric motor according to the related art, interacts with the stator so that there is an effect of increasing the amount of torque applied to the rotor 500. Furthermore, according to various exemplary embodiments of the present disclosure, the third teeth portion 390 and the third coil portion 240 winding around the third teeth portion 390 are further formed so that there is an effect of causing the magnetic flux generated by the permanent magnet 510 on the side of the center portion of the stator to interact with the stator. That is, according to various exemplary embodiments of the present disclosure, the amount of magnetic flux interacting with the rotor and the stator further increases, resulting in an effect of increasing the output of the electric motor.

Next, the application of the stator to a transverse electric motor according to various exemplary embodiments of the present disclosure will be described. The stator is positioned on both sides of the rotor so that the rotor may be positioned within the stator, and the permanent magnet may be attached to the surface of the rotor core or inserted into the rotor core. That is, for example, the permanent magnet on the rotor may be attached to the surface, embedded along the circumference, or embedded radially, but the arrangement is limited to these options.

The transverse width of the rotor may be less than the width of the space between the second teeth portion 370 and the third teeth portion. Because the transverse width of the rotor may be less than the width of the space between the second teeth portion and the third teeth portion, the permanent of rotor may be positioned between the second teeth portion and the third teeth portion.

Accordingly, the permanent magnet on the rotor is positioned between the second teeth portion and the third teeth portion so that the magnetic field generated when power is applied to the second and third coil portions winding around the periphery of the second and third teeth portions may interact with the transverse magnetic flux generated by the permanent magnet on the rotor. Furthermore, the magnetic field generated when power is applied to the first coil portion winding around the periphery of the first teeth portion and the axial magnetic flux generated by the permanent magnet on the rotor may interact with each other.

After all, when various exemplary embodiments are applied to a transverse electric motor, the amount of the magnetic flux interacting with the rotor and the stator also further increases, resulting in an effect of increasing the output of the electric motor.

Accordingly, in the electric motor according to an exemplary embodiment of the present disclosure, the stator is formed to interact with both the transverse and axial magnetic fluxes of the permanent magnet on the rotor so that the magnetic flux of the permanent magnet may be fully utilized. Accordingly, the increased amount of the interacting magnetic flux includes an effect of increasing the maximum torque of the electric motor, resulting in an effect of increasing the maximum output of the electric motor ultimately.

Furthermore, because the output of the electric motor relative to the weight is large compared to the related art, there is an effect of reducing the size of the electric motor for the same output according to an exemplary embodiment of the present disclosure.

The present disclosure has been described with reference to the accompanying drawings and exemplary embodiments but is not limited thereto and is limited by the claims described below.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electric motor comprising:
a back yoke provided as an outermost layer of a stator;
a stator core including at least two teeth portions including:
a first teeth portion protruding from the back yoke toward a center portion of the stator; and a second teeth portion protruding upwards from an external upper surface of the first teeth portion;
a coil winding around the stator core; and
a rotor, wherein a permanent magnet is mounted on a rotor core of the rotor and wherein the rotor rotates through a magnetic interaction with the stator,
wherein the at least two teeth portions of the stator core further includes a third teeth portion protruding upwards from an internal upper surface of the first teeth portion, and
wherein the coil includes:
a first coil portion winding around the first teeth portion;
a second coil portion winding around the second teeth portion, and
a third coil portion winding around the third teeth portion, and
wherein the first and second coil portions are connected to each other at end portions thereof and the first and third coil portions are connected to each other at end portions thereof so that a single coil winding around the stator core is formed.

2. The motor of claim 1, wherein the back yoke includes a first support portion positioned on a lower surface of the stator core and protruding toward the center portion of the stator.

3. The motor of claim 2, wherein a length of the first support portion protruding in a direction of the center portion of the stator is greater than a length of the first teeth portion in the direction of the center portion of the stator.

4. The motor of claim 1,
wherein the first coil portion includes windings around first and second sides of the first teeth portion and an internal surface thereof facing the center portion of the stator while the second coil portion includes windings around first and second sides and an upper surface of the second teeth portion, and
wherein the first and second coil portions are connected to each other at first and second end portions thereof on first and second sides of the stator core.

5. The motor of claim 1, wherein the coil is attached to the stator core and is secured to the stator core by applying a fixing material.

6. The motor of claim 1, wherein the permanent magnet on the rotor is disposed on a front surface of the rotor core to face the stator.

7. The motor of claim 1, wherein the stator is positioned on first and second sides of the rotor so that the rotor is positioned within the stator and the permanent magnet is attached to a surface of the rotor core or inserted into the rotor core.

8. The motor of claim 1, wherein the third teeth portion is spaced toward the center portion of the state from the second teeth portion by a predetermined length.

9. The motor of claim 1,
wherein the first coil portion includes windings around first and second sides of the first teeth portion,
wherein the second coil portion includes windings around first and second sides and the external upper surface of the second teeth portion, and
wherein the third coil portion includes windings around first and second sides and an upper surface of the third teeth portion, and
wherein the first and second coil portions are connected to each other at the end portions thereof at a rear of the stator core on first and second sides thereof and the first and third coil portion are connected to each other at the end portions thereof at a front of the stator core on first and second sides thereof.

10. The motor of claim 1,
wherein the back yoke includes a first support portion positioned on a lower surface of the stator core and protruding toward the stator center, and
wherein a length of the first support portion in a direction of the center portion of the stator is greater than a length of the first teeth portion in the direction of the center portion of the stator.

11. The motor of claim 1,
wherein the back yoke includes a second support portion extending in a height direction of the stator at the center portion of the stator and formed in a circumferential direction of the stator at the center portion of the stator, and
wherein a through hole for a shaft to pass through is formed at the center portion of the second support portion.

12. The motor of claim 11, wherein the second support portion is in contact with an internal surface of the first teeth portion facing the center portion of the stator and includes a length in the height direction equal to or greater than a height of the back yoke.

13. The motor of claim 1,
wherein the permanent magnet on the rotor is disposed on a front surface of the rotor core to face the stator, and
wherein a transverse width of the permanent magnet on the rotor is less than a width of a space between the second and third teeth portions so that the permanent magnet is positioned in the space between the second and third teeth portions.

14. The motor of claim 1,
wherein the stator is positioned on first and second sides of the rotor so that the rotor is positioned within the stator and the permanent magnet is attached to a surface of the rotor core or inserted into the rotor core, and
wherein a transverse width of the rotor is less than a width of a space between the second and the third teeth portions.

15. The motor of claim 1, wherein each of the at least two teeth portions is repeatedly formed in circumferential direction of the stator core with a predetermined angle.

* * * * *